(12) United States Patent
Gibbins

(10) Patent No.: US 8,375,481 B1
(45) Date of Patent: Feb. 19, 2013

(54) SHOWER WATER RECYCLING SYSTEM FOR TOILET FLUSHING

(76) Inventor: Joshua Gibbins, Makawao, HI (US)

(*) Notice: Subject to any disclaimer, the term of this patent is extended or adjusted under 35 U.S.C. 154(b) by 0 days.

(21) Appl. No.: 13/424,551

(22) Filed: Mar. 20, 2012

(51) Int. Cl.
A47K 4/00 (2006.01)

(52) U.S. Cl. ..................... 4/665; 4/663; 4/664

(58) Field of Classification Search .............. 4/663, 664, 4/665, 613
See application file for complete search history.

(56) References Cited

U.S. PATENT DOCUMENTS

| 3,188,656 | A | | 6/1965 | Drager | |
|---|---|---|---|---|---|
| 3,543,294 | A | | 11/1970 | Boester | |
| 3,594,825 | A | * | 7/1971 | Reid | 4/663 |
| 4,162,218 | A | | 7/1979 | McCormick | |
| 4,377,875 | A | * | 3/1983 | Brubakken | 4/665 |
| 4,653,128 | A | * | 3/1987 | Canalizo | 4/663 |
| 4,823,428 | A | * | 4/1989 | Sevigny | 4/665 |
| 5,345,625 | A | | 9/1994 | Diemand | |

* cited by examiner

Primary Examiner — Tuan N Nguyen

(57) ABSTRACT

A shower water recycling system for toilet flushing that includes a storage tank having a water pipe inlet operationally controlled by means of a float valve, the float valve maintaining a reserve volume of water within an interior cavity of the storage tank, and a pump to pump water from an outlet of the storage tank to an extant toilet cistern, the storage tank having a rotatable plug disposed in a centrally draining top surface, said plug moveable between a first drain position and a second drain position whereby a drainage collar alternately sealingly engages and disengages with a drainage pipe disposed bypassing the interior cavity, and a flush arm slidingly activates and deactivates a flush valve to drain the storage tank, as desired, whereby shower water is conserved and recycled for use in an extant toilet, as desired.

7 Claims, 4 Drawing Sheets

SHOWER WATER RECYCLING SYSTEM FOR TOILET FLUSHING

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Figure 1:
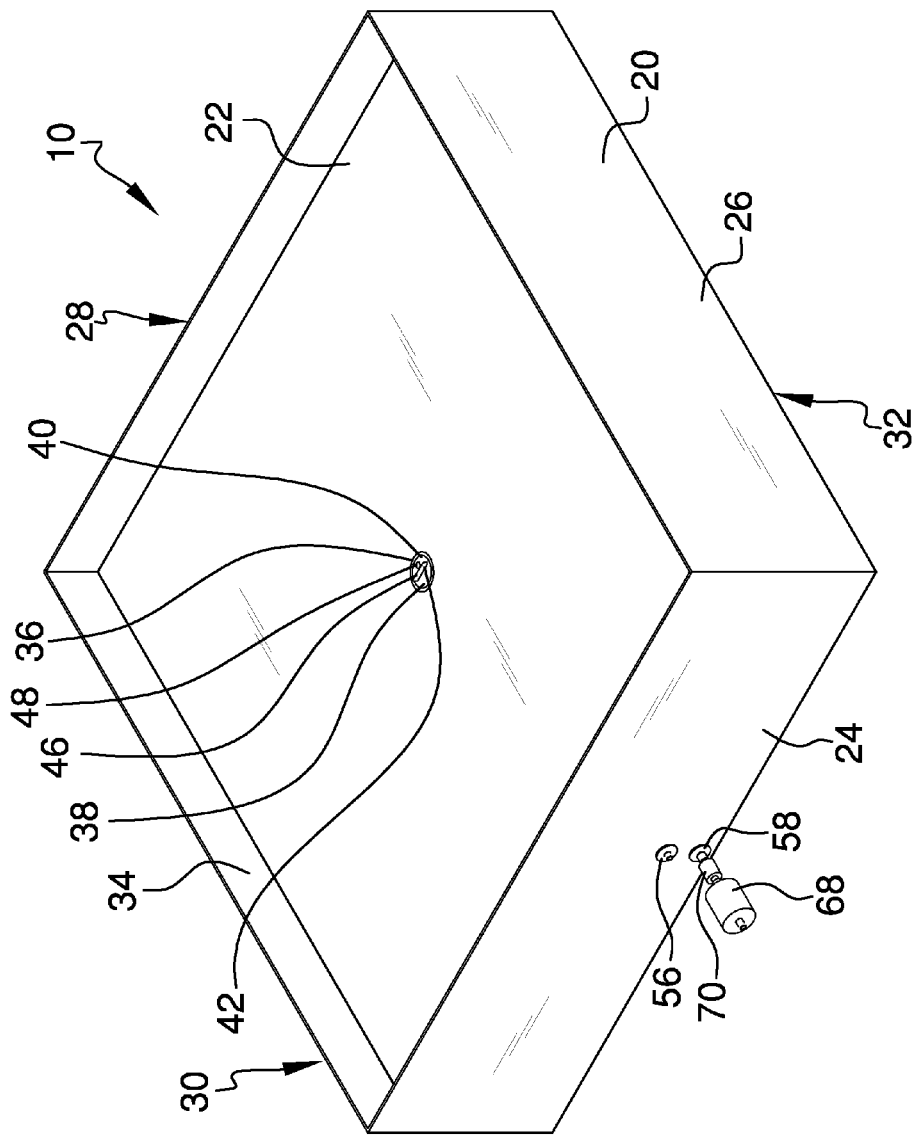

Various types of water recycling systems are known in the prior art. However, what is needed is a shower water recycling system for toilet flushing that includes a storage tank having a water pipe inlet operationally controlled by means of a float valve, the float valve maintaining a reserve volume of water within an interior cavity of the storage tank, and a pump to pump water from an outlet of the storage tank to an extant toilet cistern, the storage tank having a rotatable plug disposed in a centrally draining top surface, said plug moveable between a first drain position and a second drain position whereby a drainage collar alternately sealingly engages and disengages with a drainage pipe disposed bypassing the interior cavity, and a flush arm slidingly activates and deactivates a flush valve to drain the storage tank, as desired, whereby shower water is conserved and recycled for use in an extant toilet, as desired.

FIELD OF THE INVENTION

The present invention relates to a shower water recycling system for toilet flushing, and more particularly, to a shower water recycling system for toilet flushing that includes a storage tank having a water pipe inlet operationally controlled by means of a float valve, the float valve maintaining a reserve volume of water within an interior cavity of the storage tank, and a pump to pump water from an outlet of the storage tank to an extant toilet cistern, the storage tank having a rotatable plug disposed in a centrally draining top surface, said plug moveable between a first drain position and a second drain position whereby a drainage collar alternately sealingly engages and disengages with a drainage pipe disposed bypassing the interior cavity, and a flush arm slidingly activates and deactivates a flush valve to drain the storage tank, as desired, whereby shower water is conserved and recycled for use in an extant toilet, as desired.

SUMMARY OF THE INVENTION

The general purpose of the shower water recycling system for toilet flushing, described subsequently in greater detail, is to provide a shower water recycling system for toilet flushing which has many novel features that result in a shower water recycling system for toilet flushing which is not anticipated, rendered obvious, suggested, or even implied by prior art, either alone or in combination thereof.

The present invention has been devised to conserve water. Many toilets flush more than a gallon of water with each use. The water used by most toilets is typically municipal water, and thus potable water. A water recycling system is warranted whereby water used for showering is recycled for use with a toilet, as desired. The present shower water recycling system for toilet flushing, therefore, stores water from each use of a shower and relays that water to a toilet cistern for use when flushing the toilet.

The present shower water recycling system for toilet flushing includes a storage tank having an interior cavity disposed between a centrally draining top surface, a first side, a second side, a third side, a fourth side, and a base. The storage tank is envisioned for use with an extant shower, said shower mounted atop the storage tank.

An upper wall is disposed perimetrically around the top surface, said upper wall configured to underlie an extant shower wall. A drainage hole is centrally disposed in the top surface and shower water, under the influence of gravity, drains to, and then through, the drainage hole. A rotatable plug is sealingly disposed in the drainage hole, the rotatable plug moveable between a first drainage position and a second drainage position. The rotatable plug includes a circular body having an upper surface and a lower surface, a raised ridge disposed diametrically across the upper surface, and a hole. A cylindrical drainage collar is vertically disposed from the lower surface, the drainage collar disposed circumferentially around the hole.

When the rotatable plug is moved (by means of purchase afforded by the raised ridge) to the first drain position, the hole is disposed overlying the interior cavity. Water draining through the drainage hole thereby drains directly into the storage tank. When the rotatable plug is moved to the second drain position, the drainage collar sealingly engages with an upper end of a drainage pipe disposed vertically in the interior cavity. When the rotatable plug is in the second drain position, therefore, shower water drains through the drainage hole into the drainage pipe to drain directly through a flush drainage disposed in the base of the storage tank. Shower water is therefore drainable bypassing the storage tank when the rotatable plug is in the second drain position, and shower water is thereby drained directly into extant wastewater plumbing.

A water pipe inlet is disposed on the first side of the storage tank. A float valve is disposed in operational communication with the water pipe inlet. The float valve includes a float body disposed on a lever arm, said lever arm moveably attached to a valve disposed on the water pipe inlet. The float body displaces a volume of water with a mass greater than the float body mass, wherein the float body is positively buoyant. The float body thereby is buoyed by a volume of water within the storage tank. As the volume of water in the storage tank increases, the float body is raised. As the volume of water in the storage tank decreases, the float body is lowered.

The lever arm is moveable between a minimum position and a maximum position. The lever arm opens the valve when moved to the minimum position and the lever arm closes the valve when moved to the maximum position. Thusly, water is introduced into the storage tank through the water pipe inlet when the water volume reaches a minimum water volume. Water inflow is also ceased when the water volume in the storage tank reaches a certain volume—a reserve volume— and the lever arm is moved to the maximum position. The maximum position of the lever arm corresponds to a water volume less than a maximum volume of the storage tank. This reserve volume is a volume constantly maintained in the storage tank.

An outlet is disposed on the first side of the storage tank. Water is pumped through extant plumbing to a toilet cistern through the outlet by means of a pump disposed thereupon.

The pump is alternately activated and deactivated by the pressure within the extant plumbing system. When the extant toilet cistern is filled, an extant float valve in the cistern closes. Water in the extant plumbing system between the pump and the cistern is therefore pressurized by the pump, and the pump deactivates at a certain pressure. When the toilet is flushed, and the cistern drained so that the extant float valve is opened, water in the extant plumbing system between the pump and the cistern flows into the cistern. The resulting decrease in pressure in the extant plumbing activates the pump, and water is pumped from the storage tank into the cistern, as needed. To prohibit gross matter, such as soap residues, hair, and other matter from entering the pump, a filter is disposed between the outlet and the pump.

It should be noted that the a water level in the storage tank is maintained between a minimum volume—wherein the float valve activates the water pipe inlet—and a maximum volume—wherein water overflows into the drainage pipe upper end when the rotatable plug is positioned in the first drain position and the drainage pipe upper end is exposed, the upper end disengaged from the drainage collar. (When in the second drain position, shower water is drained directly through the drain pipe, and will not be entering the storage tank. The volume of water in the tank will therefore remain unchanged when above the reserve volume and the rotatable plug is in the second drain position.) The reserve volume, as above mentioned, is less than the maximum volume and represents the minimum operable volume for filling the extant toilet cistern.

A flush arm is disposed in operational communication with a flush valve, said flush valve disposed on the drainage pipe proximal to the base. The flush arm is slidingly moveable between a first position and a second position. When the flush arm is in the first position the flush valve is closed, and water will not drain therethrough. When moved to the second position, however, the flush valve is opened and water in the storage tank is drained through the flush drain. A knob is disposed endwise on the flush arm, the knob disposed exteriorly on the storage tank. The knob is used to move the flush arm between the first position and the second position to drain the storage tank, as desired for maintenance and cleaning.

Thus has been broadly outlined the more important features of the present shower water recycling system for toilet flushing so that the detailed description thereof that follows may be better understood and in order that the present contribution to the art may be better appreciated.

Objects of the present shower water recycling system for toilet flushing, along with various novel features that characterize the invention are particularly pointed out in the claims forming a part of this disclosure. For better understanding of the shower water recycling system for toilet flushing, its operating advantages and specific objects attained by its uses, refer to the accompanying drawings and description.

BRIEF DESCRIPTION OF THE DRAWINGS FIGURES

Figure 2:
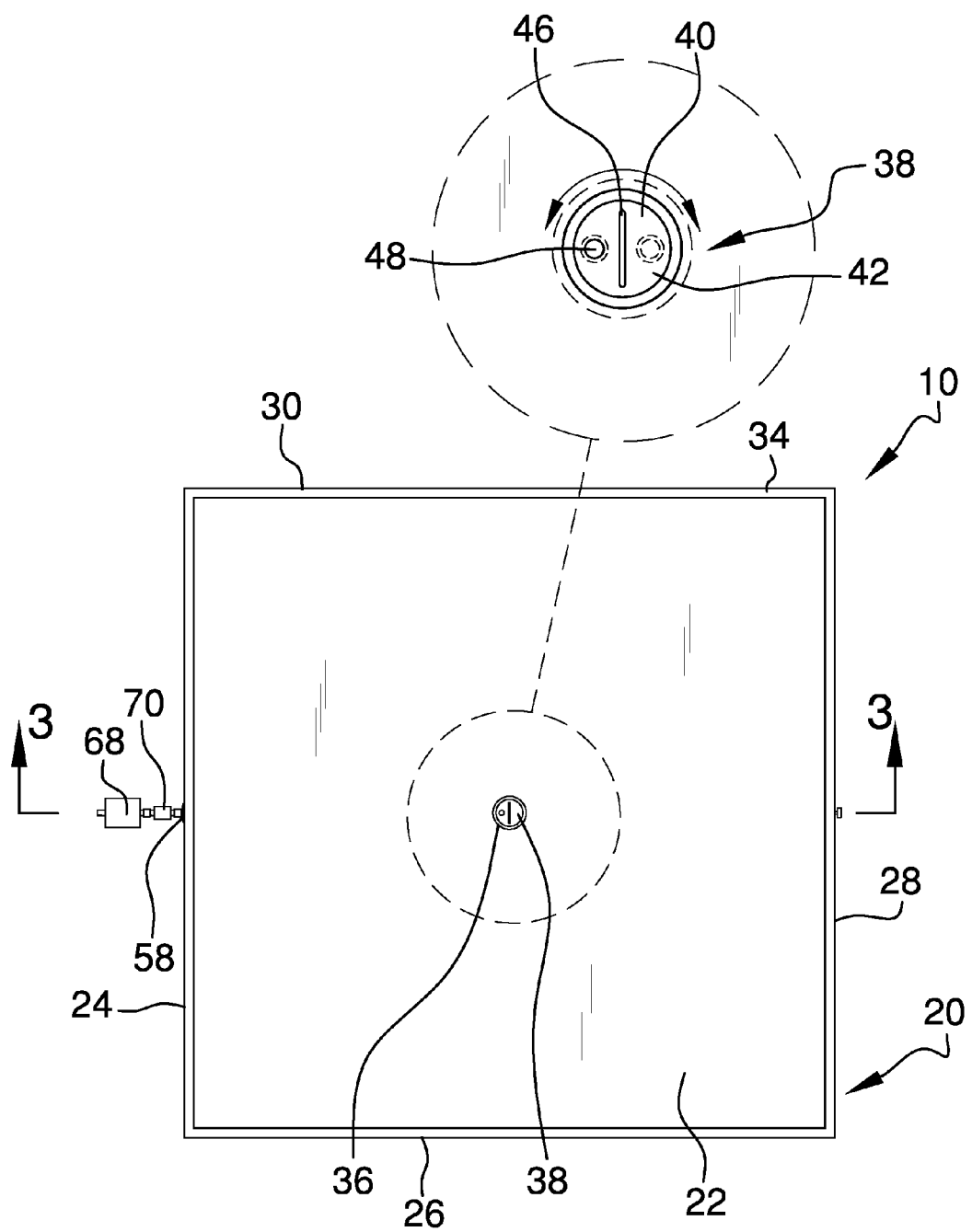
Figure 3:
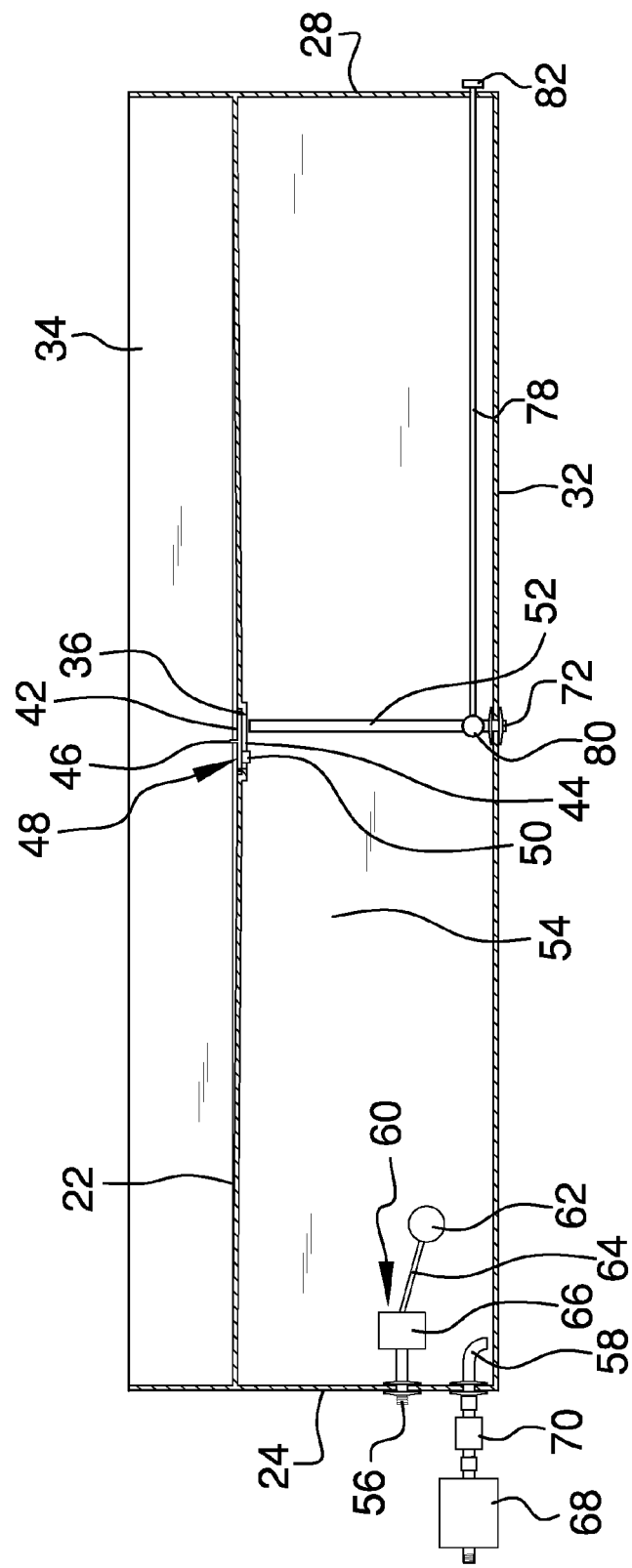
Figure 4:
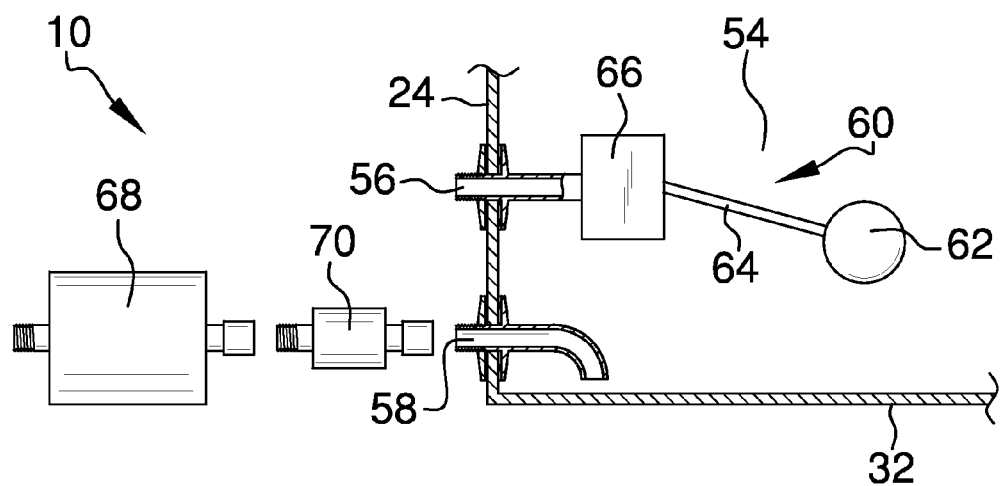
Figure 5:
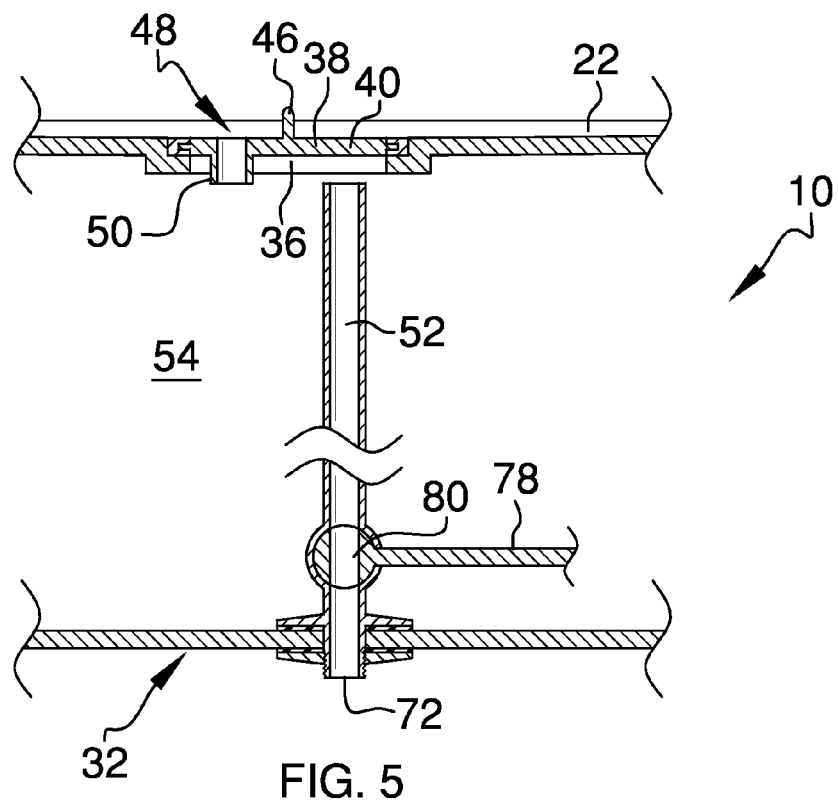

FIG. 1 is an isometric view of an embodiment of the device.
FIG. 2 is a top view of an embodiment detailing the movement of a rotatable plug.
FIG. 3 is a cross-section view of an embodiment taken along the line 3-3 of FIG. 2.
FIG. 4 is a detail view of a water pipe inlet and an outlet.
FIG. 5 is a detail view of a drainage pipe.

DETAILED DESCRIPTION OF THE DRAWINGS

With reference now to the drawings, and in particular FIGS. 1 through 4 thereof, example of the instant shower water recycling system for toilet flushing employing the principles and concepts of the present shower water recycling system for toilet flushing and generally designated by the reference number 10 will be described.

Referring to FIGS. 1 through 5 a preferred embodiment of the present shower water recycling system for toilet flushing 10 is illustrated.

The shower water recycling system for toilet flushing 10 includes a parallelepiped storage tank 20 for use with a shower (not shown). The storage tank 20 includes a centrally draining top surface 22, a first side 24, a second side 26, a third side 28, a fourth side 30, and a base 32.

An upper wall 34 is disposed perimetrically around the top surface 22. A drainage hole 36 is centrally disposed within the top surface 22. A rotatable plug 38 is sealingly disposed in the drainage hole 36, the rotatable plug 38 including a circular body 40 having an upper surface 42 and a lower surface 44. A raised ridge 46 is diametrically disposed across the upper surface 42 of the rotatable plug 38 and a hole 48 is disposed through the circular body 40. A cylindrical drainage collar 50 is disposed upon the lower surface 44, said drainage collar 50 disposed circumferentially around the hole 48. The rotatable plug 38 is rotatable between a first drain position and a second drain position to alternately engage and disengage with a drainage pipe 52, as will be described subsequently.

An interior cavity 54 is disposed between the top surface 22, the first side 24, the second side 26, the third side 28, the fourth side 30, and the base 32. A water pipe inlet 56 is disposed in the first side 24 and an outlet 58 is disposed in the first side 24. A float valve 60 is disposed within the interior cavity 54, the float valve 60 in operational communication with the water pipe inlet 56. The float valve 60 includes a float body 62 disposed endwise on a lever arm 64, said lever arm 64 moveably connected to a valve 66 operationally communicating with the water pipe inlet 56. When a water volume within the storage tank 20 reaches a minimum, the float body 62 is lowered to a minimum position, the valve 66 is opened, and water is introduced into the storage tank 20 through the water pipe inlet 56. The float body 62 is buoyed by a rising water level within the storage tank 20. When the water volume reaches a determined volume, a "reserve" volume, the float body 62 is raised to a maximum position, and the lever arm 64 is moved to close the valve 66 to cease the inflow of water into the storage tank 20. Thusly, the reserve volume of water is maintained within the storage tank 20, said reserve volume having a volume greater than a predetermined minimum volume but less than a maximum volume.

A pump 68 is disposed on the outlet 58. The pump 68 pressurizes water in extant plumbing to an extant toilet cistern (not shown). When said toilet is flushed, the cistern drains through the toilet bowl and the pressure in the extant plumbing between the pump 68 and the toilet cistern is lowered. The pump 68 is activated by the drop in pressure, and the pump 68 pumps water from the storage tank 20 to the cistern to refill the cistern for a subsequent flush of the toilet. A filter 70 is disposed between the outlet 58 and the pump 68, said filter 70 inhibiting gross matter (such as hair and soap residues) from entering the pump 68. Thusly, water from the storage tank 20 is relayed to a toilet. Said water may be water inflowed into the storage tank 20 through the water pipe inlet 56, and alternately "gray" water introduced into the storage tank 20 through the hole 48 in the rotatable plug 38 when a shower is used in conjunction with the device 10.

Discussing now the structural elements of the device 10 whereby "gray" water is alternately introduced into the storage tank 20 and selectively bypassed as drainage through an extant waste plumbing system, as desired, a flush drainage 72 is centrally disposed in the base 32. The flush drainage 72 interconnects with extant plumbing for wastewater drainage from an extant shower used in conjunction with the device 10. A drainage pipe 74 is vertically disposed between the drainage hole 48 in the top surface 22 and the flush drainage 72. The drainage pipe 74 has an upper end 76 positioned beneath the plug 38, the plug 38 drainage collar 50 rotatably sealingly engaging with the drainage pipe 74 upper end 76 when the rotatable plug 38 is moved to the second drainage position. When the rotatable plug 38 is moved to the first drainage position, the drainage collar 50 is moved to disengage with the drainage pipe 74 upper end 76, and water draining from the extant shower, as used in conjunction with the present device 10, drains through the hole 48 into the storage tank 20.

When the rotatable plug 38 is moved to the first drainage position, and the drainage collar 50 disengages with the upper end 76 of the drainage pipe 74, said upper end 76 thereby exposed within the interior cavity 54. Thusly, a maximum volume of water is defined within the interior cavity 54 of the storage tank 20, said maximum volume limited by overflow drainage through the drainage pipe 74. When water, introduced to the interior cavity 54 of the storage tank 20, reaches a level exceeding the height of the drainage pipe 74 upper end 76, said water drains through the drainage pipe 74 into the flush drainage 72 and out of the storage tank 20. Thusly, a volume of water is maintained within the storage tank 20 below the maximum volume.

A moveable flush arm 78 is disposed upon the drainage pipe 74. The flush arm 78 is slidingly moveable between a first position and a second position to alternately close and open a flush valve 80, the flush valve 80 disposed proximal to the base 32. A knob 82 is disposed on the flush arm 78, the knob 82 disposed exteriorly upon the storage tank 20. When the flush arm 78 is moved to the second position, the flush valve 80 is opened and water is drainable through the flush drainage 72 disposed in the base 32 of the storage tank 20. When the flush arm 78 is moved to the first position, the flush valve 80 is closed and water is prohibited from draining into the flush drainage 72, except through the drainage pipe 74 upper end 76, as in the manner described hereinabove. The flush arm 78 therefore enables flushing of the storage tank 20, as may be desired for maintenance or cleaning.

What is claimed is:

1. A shower water recycling system for toilet flushing comprising:
    a parallelepiped storage tank for use in conjunction with a shower, the storage tank comprising:
        a centrally draining top surface;
        a first side;
        a second side;
        a third side;
        a fourth side;
        a base;
    an interior cavity disposed between the top surface, the first side, the second side, the third side, the fourth side, and the base;
    an upper wall disposed perimetrically around the top surface;
    a drainage hole centrally disposed within the top surface;
    a rotatable plug sealingly disposed in the drainage hole, the rotatable plug comprising:
        a circular body having an upper surface and a lower surface;
        a raised ridge diametrically disposed across the upper surface;
        a hole disposed through the circular body;
        a cylindrical drainage collar disposed upon the lower surface, the drainage collar disposed circumferentially around the hole;
    a water pipe inlet disposed in the first side;
    a float valve disposed within the interior cavity, the float valve in operational communication with the water inlet;
    an outlet disposed in the first side, the outlet in operational communication with an extant toilet cistern;
    a pump disposed on the outlet;
    a filter disposed between the outlet and the pump;
    a flush drainage centrally disposed in the base, the flush drainage plumbed with an extant wastewater pluming system;
    a drainage pipe vertically disposed between the drainage hole and the flush drainage;
    a flush valve disposed on the drainage pipe proximal to the base;
    a moveable flush arm in operational communication with the flush valve, the flush arm slidingly moveable between a first position and a second position to alternately close and open the flush valve;
    a knob disposed on the flush arm, the knob disposed exteriorly upon the storage tank;
wherein the rotatable plug drains water into the storage tank when in the first drainage position, and into the drainage pipe when in the second drainage position, the float valve activates the water inlet to inflow water from extent plumbing into the interior cavity when a water volume reaches a minimum volume, the flush arm drains the storage tank through the central drainage when moved to the second position, and the pump pressurizes water from the storage tank, through the outlet, into extant plumbing to an extant toilet cistern.

2. The shower water recycling system for toilet flushing of claim 1 wherein the drainage collar alternately engages and disengages with the drainage pipe upper end when the rotatable plug is moved between the first drain position and the second drain position.

3. The shower water recycling system for toilet flushing of claim 2 wherein the drainage pipe upper end is exposed within the interior cavity when the rotatable plug is moved to the first position and the drainage collar disengages with the drainage pipe upper end, whereby water drains through the drainage pipe upper end when a water volume in the storage tank exceeds a maximum volume.

4. The shower water recycling system for toilet flushing of claim 3 wherein the pump pumps water from the storage tank through extant plumbing to an extant toilet cistern, said pump activated when pressure in the extant plumbing drops, said pressure lowered when the toilet is flushed and the cistern emptied.

5. The shower water recycling system for toilet flushing of claim 4 wherein the pump deactivates when the pressure in the extant plumbing between the pump and the extant toilet reaches a determined pressure.

6. The shower water recycling system for toilet flushing of claim 5 wherein the rotatable plug raised ridge is disposed within a plane accordant with the storage tank top surface.

7. A shower water recycling system for toilet flushing comprising:
    a parallelepiped storage tank for use with a shower, the storage tank comprising:
        a centrally draining top surface;
        a first side;
        a second side;
        a third side;
        a fourth side;
        a base;

an interior cavity disposed between the top surface, the first side, the second side, the third side, the fourth side, and the base;
an upper wall disposed perimetrically around the top surface;
a drainage hole centrally disposed within the top surface;
a rotatable plug sealingly disposed in the drainage hole, the rotatable plug comprising:
a circular body having an upper surface and a lower surface;
a raised ridge diametrically disposed across the upper surface;
a hole disposed through the circular body;
a cylindrical drainage collar vertically disposed upon the lower surface, the drainage collar disposed circumferentially around the hole;
wherein the plug is rotatable between a first drain position and a second drain position;
a water pipe inlet disposed in the first side;
a float valve disposed within the interior cavity, the float valve in operational communication with the water inlet, the float valve comprising:
a valve;
a lever arm in operational communication with the valve;
a float body disposed upon the lever arm;
wherein the float body moves the lever arm between a minimum position and a maximum position to regulate an inflow of water into the storage tank above a minimum volume whereby a reserve volume is maintained;
an outlet disposed in the first side, said outlet plumbed with an extant toilet cistern;
a pump disposed on the outlet;
a filter disposed between the outlet and the pump;
wherein the pump pumps water from the storage tank to the extant toilet cistern when the cistern is emptied by use of said toilet;
a flush drainage disposed in the base, the flush drainage interconnected with an extant wastewater plumbing system;
a drainage pipe vertically disposed between the drainage hole and the flush drainage, the drainage pipe having an upper end disposed beneath the rotatable plug;
wherein the drainage collar alternately engages and disengages with the drainage pipe upper end when the rotatable plug is moved between the first drain position and the second drain position;
wherein the upper end is exposed within the interior cavity when the rotatable plug is moved to the second position, whereby a water volume within the storage tank is maintained up to a maximum volume;
a flush valve disposed on the drainage pipe proximal to the base;
a moveable flush arm in operational communication with the flush valve, the flush arm slidingly moveable between a first position and a second position to alternately close and open the flush valve;
a knob disposed on the flush arm, the knob disposed exteriorly upon the storage tank;
wherein the knob alternately opens and closes the valve to drain the storage tank when the flush arm is moved between the first position and the second position;
wherein the drainage collar sealingly engages with the drainage pipe upper end when the rotatable plug is moved to the second drain position, and the drainage collar disengages with the drainage pipe upper end when the rotatable plug is moved to the first drain position;
wherein water from an extant shower drains alternately into the interior cavity and the drainage pipe;
wherein the float valve activates the water inlet to inflow water from extent plumbing into the interior cavity and the pump pumps water through extant plumbing to an extant toilet cistern;
whereby a water volume is maintained between a maximum volume and a minimum volume within the storage tank.

* * * * *